INVENTORS
STANLEY A. DASHEW
JOHN S. TUMPAK
CHARLES D. SUTTON
BY Samuel Lindenberg
ATTORNEY INVENTORS
STANLEY A. DASHEW
JOHN S. TUMPAK
CHARLES D. SUTTON
BY Samuel Lindenberg

ATTORNEY

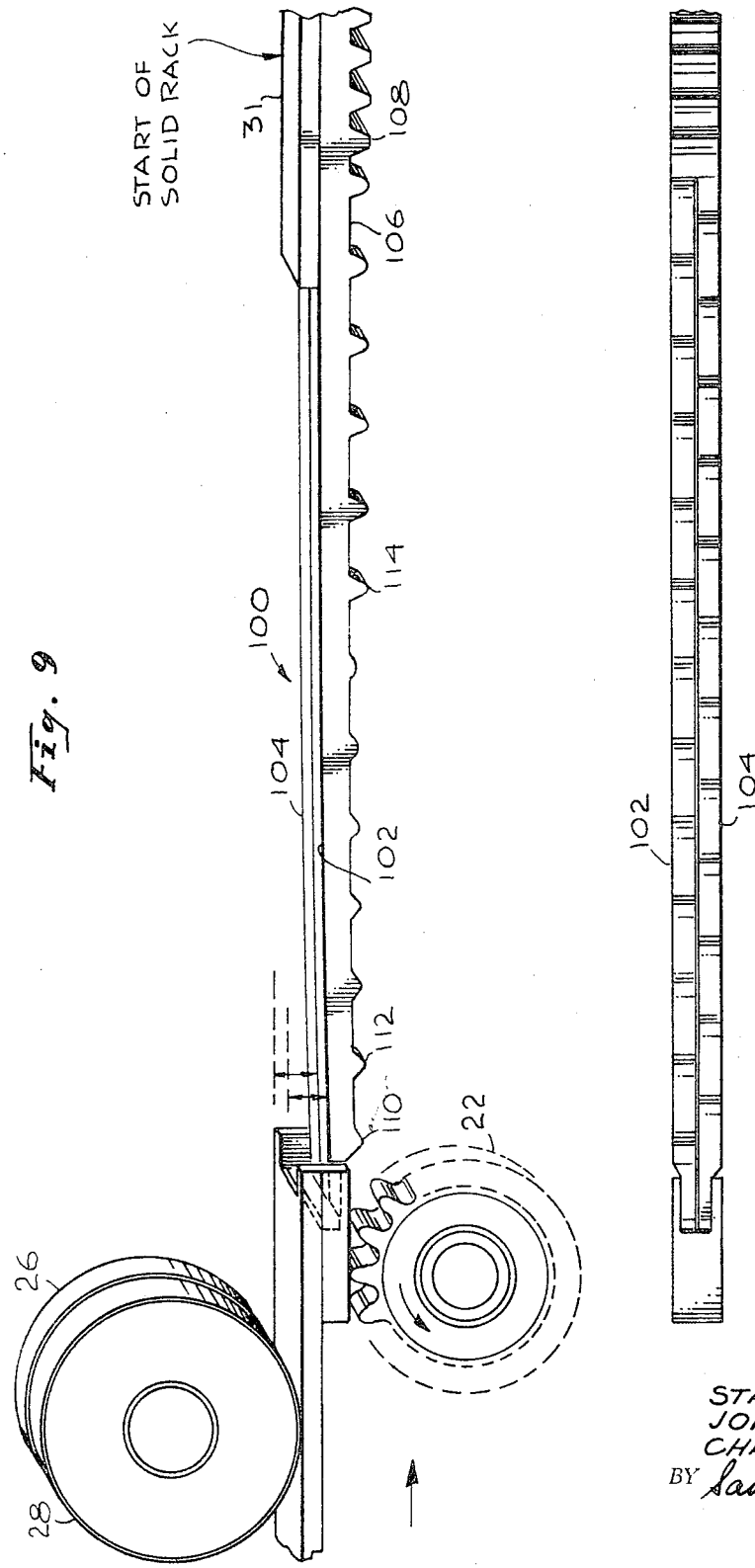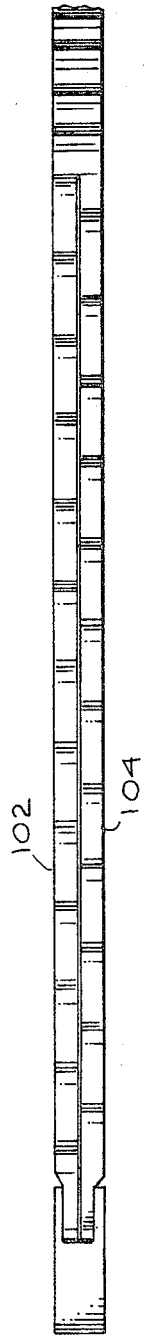

United States Patent Office 3,429,280
Patented Feb. 25, 1969

3,429,280
RACK AND PINION VEHICLE
PROPULSION SYSTEM
Stanley A. Dashew, Beverly Hills, John Tumpak, Woodland Hills, and Charles D. Sutton, Los Angeles, Calif., assignors to The Dashaveyor Company, Venice, Calif., a corporation of California
Filed Apr. 1, 1966, Ser. No. 539,421
U.S. Cl. 105—29                                 16 Claims
Int. Cl. B61b 5/00, 31/02; B61c 11/04

ABSTRACT OF THE DISCLOSURE

A rack rail and pinion vehicle propulsion system where two transmissions are driven by two electrical motors which are in side by side relationship. Each transmission has extending therefrom at least two drive shafts. One of these provides high speed and low torque, and the other provides low speed and high torque. The high speed low torque drive shaft has mounted thereon a drive wheel. Coaxially therewith is mounted an idler wheel. The low speed high torque shaft has mounted thereon a gear wheel. A track is inserted between the high speed and idler wheels and the gear wheel so that the high speed wheel engages a top surface thereof and the gear wheel engages a rack track which is positioned on the undersurface of said track. When the rack track is present the surface of the track underneath the high speed wheel is removed and the track surface is brought up to contact the idler wheel which takes over the function of supporting the vehicle load. A pinch wheel is positioned adjacent the gear wheel. It bears upwardly on the undersurface of the track to insure positive traction. Provision is made by means of a synchronizing track section for synchronizing the gear wheel with the rack track. Provision is made for a braking function for the vehicle and for cooling functions of the vehicle motors.

---

This invention relates to vehicle propulsion systems, and more particularly to improvements therein.

A cargo transportation system has been proposed which, briefly described, comprises a train made up of cars, each of which is completely enclosed. The train rides on rails which may be supported within an enclosure through which the train moves. Each car or module of the train has a hinged door. Special tracks are provided which engage a roller cam on the door for moving the door open when it is desired to load a module and for thereafter closing the door. A similar operation is gone through when it is desired to unload the module, but in this instance, for the process of unloading, the rails are curved to cause the car to turn over for the unloading process.

This cargo transportation system is expected to find extensive use in areas of rugged terrain, underwater or in carrying ore from within a mine to the surface. One of the proposed features of this arrangement is that a train of modules can move up or down a grade no matter how steep. In order to achieve this, positive traction is required and it has been proposed to use a rack type of track with a pinion gear engaging said track for insuring that a train of modules can ride up a vertical grade, if necessary. While this sounds like a simple solution to the problem of obtaining the required traction, it is really not simple. It is not desirable to have the rack and gear wheel engaged when the train is running on a level or over small grades since the train cannot travel at as high a speed as can be obtained using conventional round wheel and track. Obviously it is desirable to run trains at as high a speed as can be reasonably and safely attained. If the rack and gear arrangement is employed only where the steepness of the grades to be traversed warrant these, and conventional wheels and tracks are used elsewhere, then the problem arises of transferring power from the conventional wheels to the gears, and also of engaging the gears with the racks when this is required without breaking teeth.

This problem has been solved heretofore by using clutches which disengage the conventional wheels and the gear wheels from coupling to the driving transmission and then transfer the coupling to the gear wheels, after the gear wheels have been brought into engagement with the rack gear. The gear wheel cannot be made to engage the rack gear while coupled to the driving system of the train since this results in the teeth of the rack and gear being broken. The clutch between the gear and the driving system is decoupled so that the only mass which strikes the rack gear while the train is moving is that of the gear wheel which is quite low. Thereafter the clutch coupling the gear wheel to the power applying system or transmission is engaged.

The foregoing briefly described arrangement is quite cumbersome and expensive. The clutches wear out and must be periodically replaced. There is a substantial change in the train speed when the clutch to the gear wheel is engaged. In a system such as the one being proposed herein wherein the module rides within a tube any additional space taken up by drive machinery reduces the amount of space which can be used by the module for carrying bulk. Further, any additional weight required for the driving machinery reduces the carrying weight which a module can handle. This becomes a most significant factor in the proposed system since its utility will be for the most part in those regions where grades are steep and there are a large number of these.

The present invention is directed to a vehicle propulsion system which can solve the problems previously pointed out where it is desired to go from one type of traction to another type of traction, such as from the conventional wheel drive system to a gear wheel drive system.

Another feature of this invention is the provision of an arrangement wherein a transfer may be made from a conventional drive system to the gear wheel drive system without using clutches.

Still another feature of the invention is the provision of a novel transmission system for applying power to the conventional wheel drive system and to the gear wheel drive system.

A further feature of the present invention is the provision of a novel driving and braking system.

The foregoing features are achieved in an arrangement wherein a car or module which is used for providing rolling traction contains a driving system effectively comprising either a single split electrical motor in a common housing, or two motors axially displaced in a common housing. Power output from each motor is applied to a separate transmission system each of which applies torque simultaneously to two torque output shafts. One of these shafts has fixed thereon the conventional round wheel and is driven at a high speed. The other shaft has fixed thereon a gear wheel and is driven at a relatively low speed. When because of the necessity for pulling a train up a steep grade, it is desired to shift from conventional wheels to the gear wheel drive, the shape of the track is altered so that it no longer engages the conventional wheel and the gear wheel engages a rack track. However additional wheels called idler wheels are provided which insure that there is no sudden shift in the weight of the car from the conventional wheel to the gear wheel. A unique arrangement is provided whereby even though the rack gear is coupled to the transmission and has the inertia of the module behind it, its gear teeth are brought into synchronism with the rack gear in a manner so that no damage occurs. Thereafter, when the necessity for the gear drive is terminated, the rack track is discontinued and the conventional track for engaging the driven round wheel is brought into contact with the round wheel periphery again.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURES 9 and 10 show the synchronizing rack track; and

Figure 1:
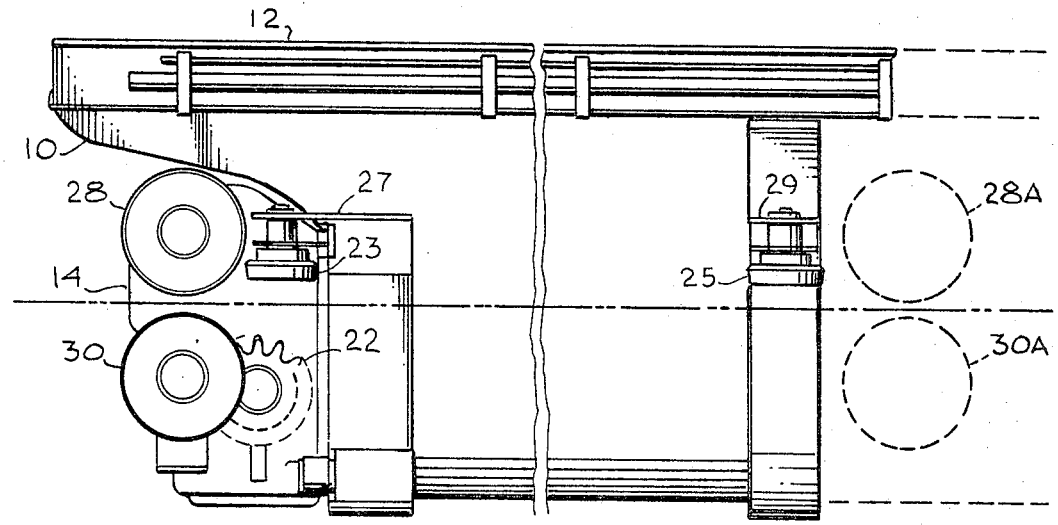
FIGURE 1 is a side view of a module shown to assist in an understanding of this invention.

FIGURE 1 is a view in elevation of a car or module which is the type of vehicle with which the proposed propulsion system in accordance with this invention is used. It should be noted that this is shown by way of example and is not to be construed as a limitation upon the invention, since this propulsion system may find use with other shapes or types of modules without departing from the spirit or scope of this invention. A module comprises a container 10 which has a hinged cover 12 over the top of the container, which may open for loading, closed for transportation, and open again for unloading. A conventional hinged cover may be used, if desired, or an arrangement may be provided for the automatic opening or closing of the cover of the container. However, since these details are not a part of this invention, they will not be described further herein.

Figure 2:
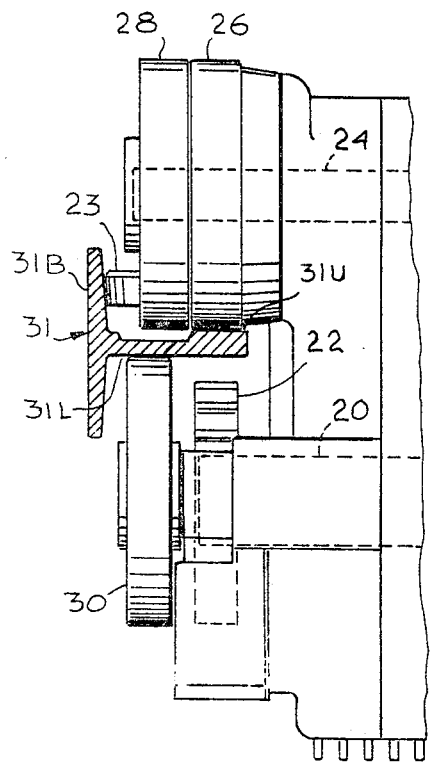
FIGURE 2 is a partial front view of a module shown in FIGURE 1 which illustrates the configuration of a track when the module is traveling at high speeds.
Figure 3:
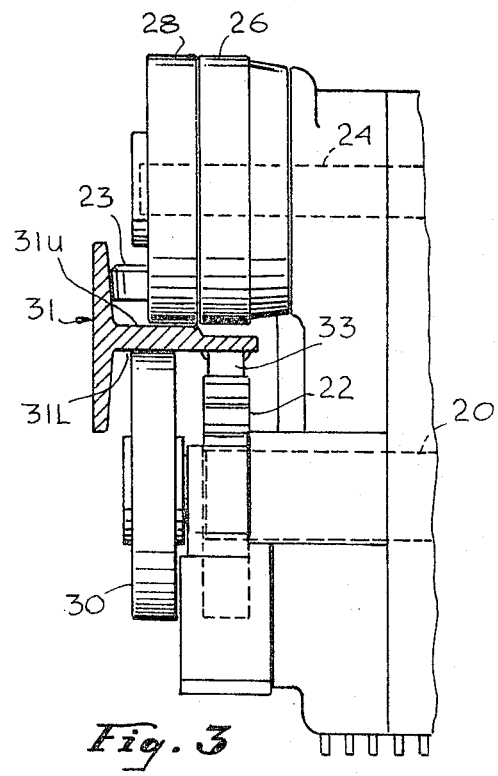
FIGURE 3 is a front view of the module shown in FIGURE 1 illustrating the configuration of the track when the rack and pinion gear are engaged, or when the module is in low speed drive.

The view of the container shown in FIGURE 1 does not show the track on which the wheels of the container roll. The view of the wheels engaging the track are shown in FIGURES 2 and 3. A power propulsion portion of the container or power unit assembly 14 is attached to one end of the container assembly 10. The description that follows which is directed to the arrangement of the wheels which are driven from the power unit assembly, and the track, in view of the symmetry of the system, will be directed to those components on only one side of the power unit assembly and the module. It will be understood however that the counterpart of the equipment described is found on the other side of the module. This is being done to simplify both the description and the drawings.

A high torque pinion shaft 20, which is driven from the power unit assembly, has mounted thereon a pinion or gear wheel 22. A low torque high speed shaft 24 which extends from the power unit assembly and is driven thereby, has mounted thereon a wheel 26 which is designated as the low traction high speed wheel. In addition to the driven wheels just described, there are also provided an upper idler wheel 28 and a lower idler wheel 30. The upper idler wheel 28 is mounted upon a bearing which is mounted upon the shaft which drives the high speed low torque wheel 26. The wheel 28 is the same size as the wheel 26. The lower idler wheel 30 is spring biased against the track by structure which will be shown and described subsequently herein. The wheels 28A and 30A which are at the other end of the module correspond to the respective wheels 28 and 30. There are also mounted on each side of the module two side wheels 23, 25 which rotate about an axis at right angles to that of the other wheels of the module. These side wheels are rotatably supported by support members 27, 29, which are bolted to the sides of the module.

FIGURE 2 shows the configuration of the track 31 when a high speed drive of the module is desired and where there is no requirement for output of substantial torque. The track 31, which is shown herein in cross-section, has a base portion 31B to which attachment is made for supporting the track at a desired location. The side wheels 23, 25 engage the base portion and serve to stabilize the module against lateral sway. They also serve to maintain the other wheels in proper position on the rails. Extending outwardly from the base portion 31B is the portion upon which the wheels of the module ride. This has an upper surface 31U and a lower surface 31L. As shown in FIGURE 2, the upper surface 31U has a raised portion so that it engages only the low torque high speed wheel 26 and does not engage the idler wheel 28. The lower surface 31L is only engaged by the spring biased lower idler wheel 30. The gear wheel 22, although it is continuously driven, as is the high speed wheel, it does not engage any track surface at this time. As a result, the module can run at a high speed, with the track configuration as shown in FIGURE 2.

FIGURE 9 shows the track configuration when the module is running at low speed but has high torque applied thereto whereby it can climb grades up to 90°. It will be seen in FIGURE 3 that the raised portion of the upper surface 31U of the track is placed to engage the upper idler wheel 28. The remainder of the upper surface is cut away from underneath the high speed low torque wheel 26 whereby it is free to rotate. However, the lower surface 31L now has on the portion thereof adjacent the gear wheel 22, a rack gear 33. This rack gear may be formed on the track 31 when it is initially made, or may be a separate gear which is attached in any one of several known ways to the track at those locations where high torque is required. The lower idler wheel still engages the lower track surface 31L. The side wheels still engage the base of the track. As a result of the substitution of the upper idler wheel for the high speed wheel, there is no sudden shift in weight from the high speed wheel to the pinion gear when a transfer is made between these two, since the position of the load is maintained by the idler wheels.

From the foregoing, it should be appreciated that both the high speed low torque wheel and the gear wheel are driven continuously from the power unit assembly. The determination of which one of these engages the track and thus propels the module is made by the omission of the portion of the upper track surface which contacts the high speed drive wheel periphery and the provision of a rack gear for engaging with the gear wheel, or by the absence of the rack gear and the provision of the portion of the upper track surface which can be engaged by the periphery of the high speed low torque wheel. The transfer of drives from the low speed gear drive to the high speed wheel drive provides no problem, since this is merely done by changing the track configuration as is described. However, in view of the fact that the gear wheel is continuously driven, the gear wheel must be properly phased with the rack gear when they are made to engage one another for driving the vehicle, or else either a jamming action will occur or the teeth of the gear and/or rack are broken. The solution to this problem is the structure which has been developed in accordance with this invention will be described in FIGURES 9 and 10 herein after a description of the power unit assembly.

Figure 4:
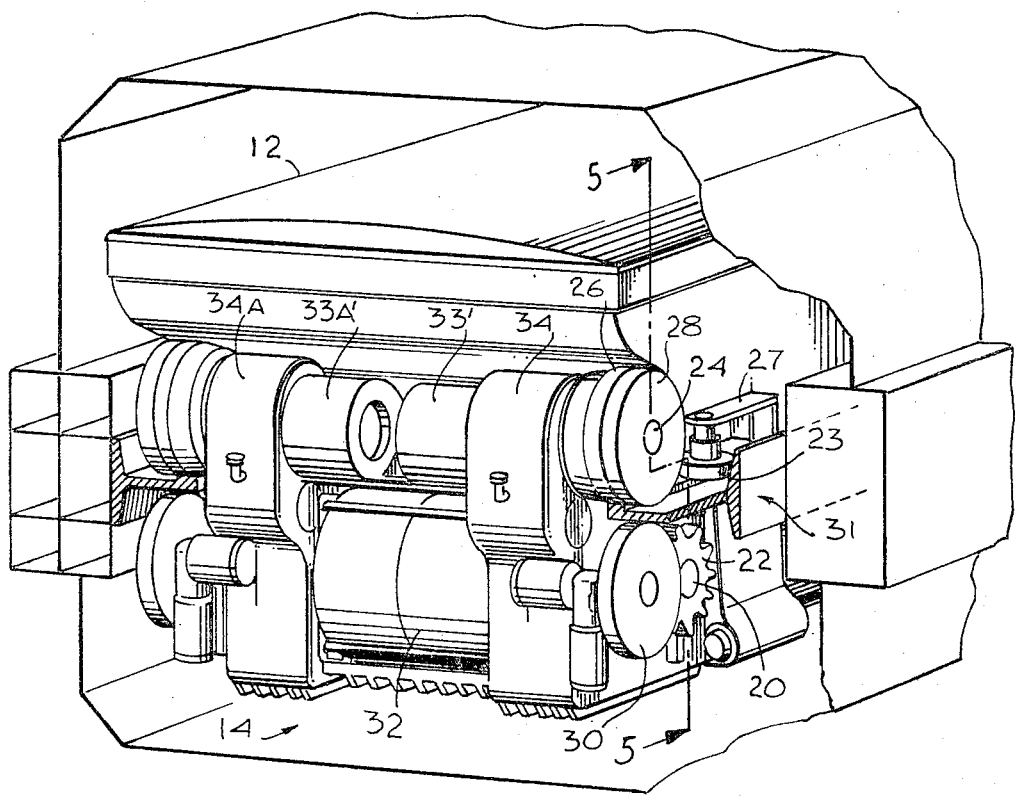
FIGURE 4 is a perspective view showing the power unit assembly which drives the module.

Reference is now made to FIGURE 4 which is a front perspective view of the power unit assembly 14 with covers in place. This power unit includes the motor drive and the transmission. As seen in FIGURE 4 there is a single motor housing cover 32 which completely covers two motors, (shown later). These motors are side by side with respect to one another. Above the housing cover 32 may be seen two shrouds respectively 33', 33A', one for each blower which is used to cool each motor. These blowers (shown later) are driven by the respective motors through gear assemblies which are covered by the respective gear cases, respectively 34, 34A. Each gear assembly drives two shafts, the high torque pinion shaft 20, and the low torque high speed shaft 24. The high torque low speed pinion shaft 20 has mounted thereon the gear wheel 22. The low torque high speed pinion shaft 24 has mounted thereon the low traction wheel 26 and the upper idler wheel 28. The lower idler wheel 30 is mounted below the upper idler wheel. The lower idler wheel is mounted on a crank axle, the details of which will be provided in the description of FIGURE 8.

Figure 5:
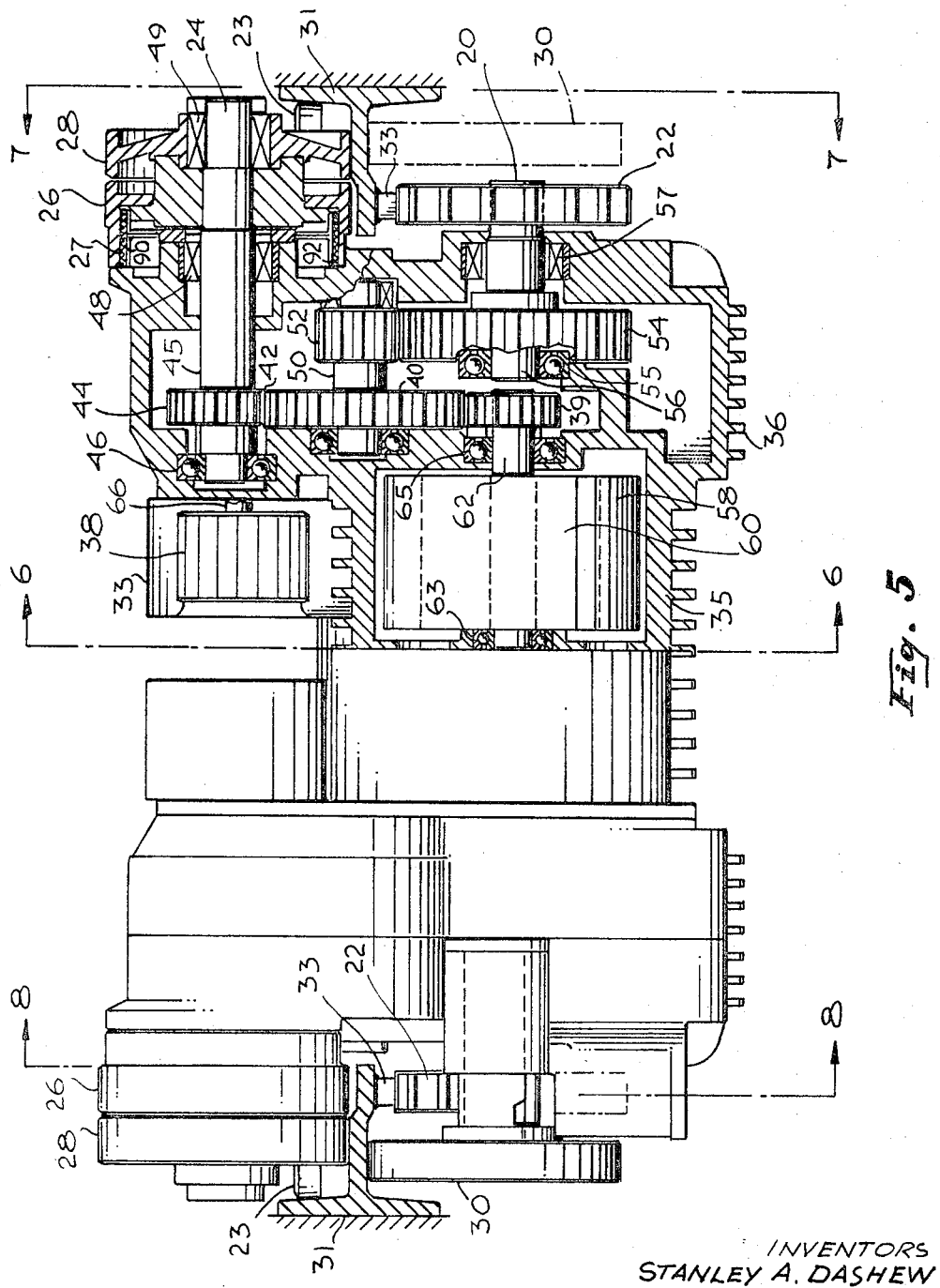
FIGURE 5 is a cross-section along the lines 5—5 of FIGURE 4 which shows further details of the power unit assembly.

FIGURE 5 is a cross-sectional view taken along the lines 5—5 of FIGURE 4 and shows the details of the gear assemblies. The motor housing cover is omitted and what is shown is the motor housing 35 which has fins 36 extending radially therefrom. The motor housing cover 32 together with the motor housing 35 provide ducts which cooling air is blown by the blower 38. The motors are completely enclosed by the motor housing and no dirt can get at them. The blower is driven by the motor through the gear assembly.

A motor pinion gear 39 is driven by the motor. A primary bull gear 40, supported on a shaft 50, is driven by the motor pinion gear 39. The primary bull gear 40 drives an idler gear 42, only a portion of which may be seen in this view, which idler gear in turn drives a high speed gear 44. The high speed gear 44 is mounted on a shaft 45 which is supported by the respective bearings 46, 48. One end of the shaft 45 is a reduced diameter portion which comprises the low torque high speed shaft 24. The high speed wheel 26 is mounted on the shaft 24. A bearing 49 is mounted on the end of the shaft 24 and the upper idler wheel is mounted on the bearing.

The primary bull gear 40 is mounted on a shaft 50 upon which there is also mounted a secondary bull gear 52. The secondary bull gear which is rotated by the shaft 50, engages and drives a tertiary bull gear 54. The tertiary bull gear is supported upon a shaft 56 which is supported rotatably in bearings 55, 57. The shaft 56 extends out of the gear box to become the high torque pinion shaft 20.

The electrical motor includes a stator 58 and a rotor 60. The rotor is mounted on a shaft 62 upon an end of which is also mounted the motor pinion gear 39. The motor shaft is supported in bearings 63, 65.

Figure 6:
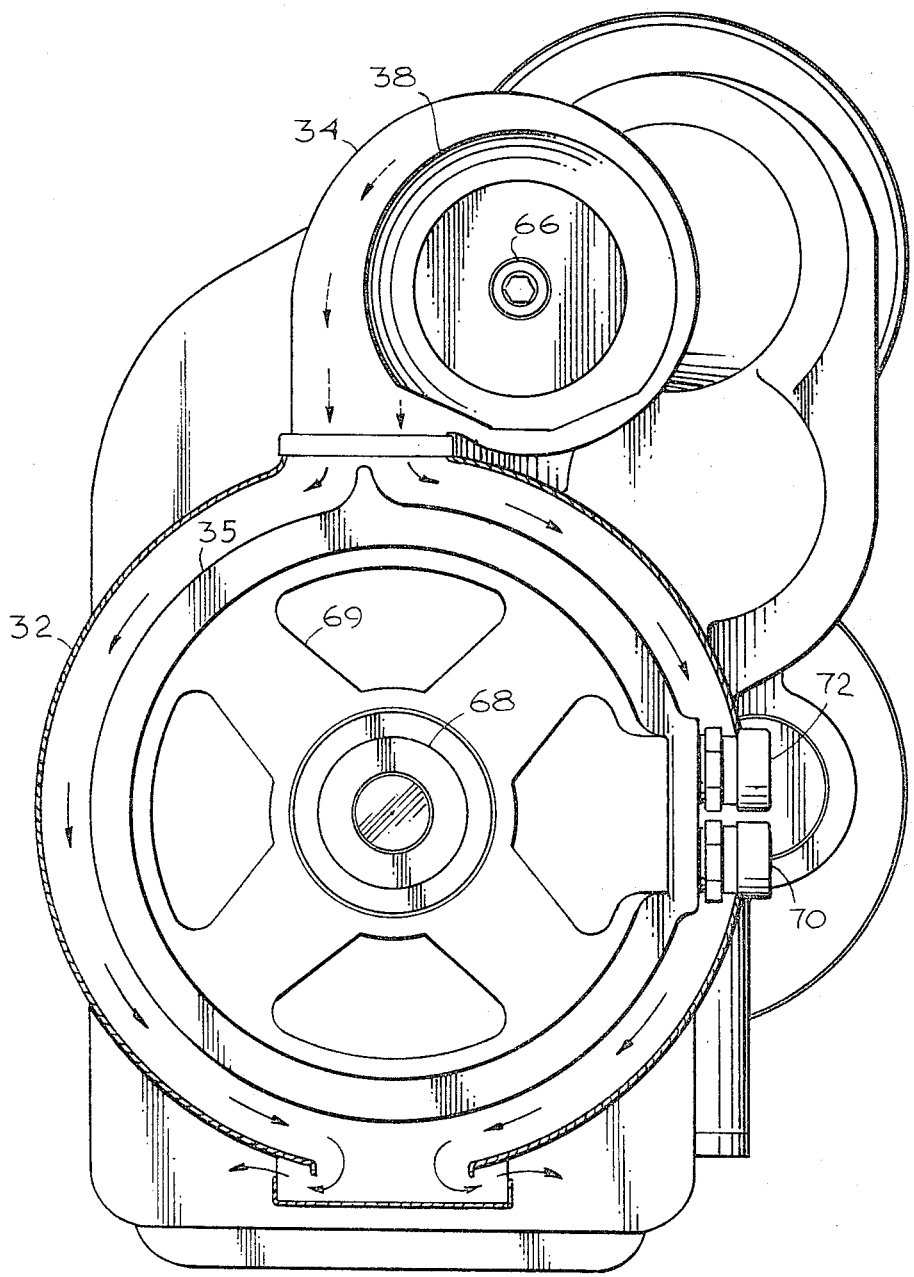
FIGURE 6 is a view along the lines 6—6 of FIGURE 5 and shows the cooling arrangement for the motor drive power unit assembly.

FIGURE 6 is a view along the lines 6—6 which illustrates the cooling system for the motor. It will be seen that the blower 38 rotates upon a shaft 66. This shaft is driven from the gear assembly and more specifically from the high speed gear 44 through an intermediate gear (not shown). The blower circulates air through its shroud 34 into the spacing between the motor housing cover 32 and the motor housing 35. The direction of air flow is indicated by the arrows. In this manner, the temperature of the motor is maintained within usable ranges. As a matter of fact, it has been found by tests run on the actual embodiment of the invention, that this manner of cooling the motor is much more efficient than by placing a blower on the motor shaft to pull air through the windings of the motor. The stator windings which are in contact with the motor housing 35 transmit their temperature directly to the motor housing which is then cooled by the air being blown directly onto the motor through the vanes 36. To further insure that the cooling action is sufficient, the motor housing 35 is made of aluminum, which is a better heat conductor than the iron normally employed for such purposes.

There also may be seen the motor separator wall. This is supported within the motor housing and supports at its center the bearings (only 68 being shown) within which the two motor shafts are journalled. It should be noted that the housing has actually two bearings 68 therein, one for the motor section on the right side and the other for the motor section on the left side. The cable clamps 70, 72 hold the cables which pass through openings in the motor housing, whereby these cables may be connected to the stator of the motor for the purpose of applying electrical current thereto.

Figure 7:
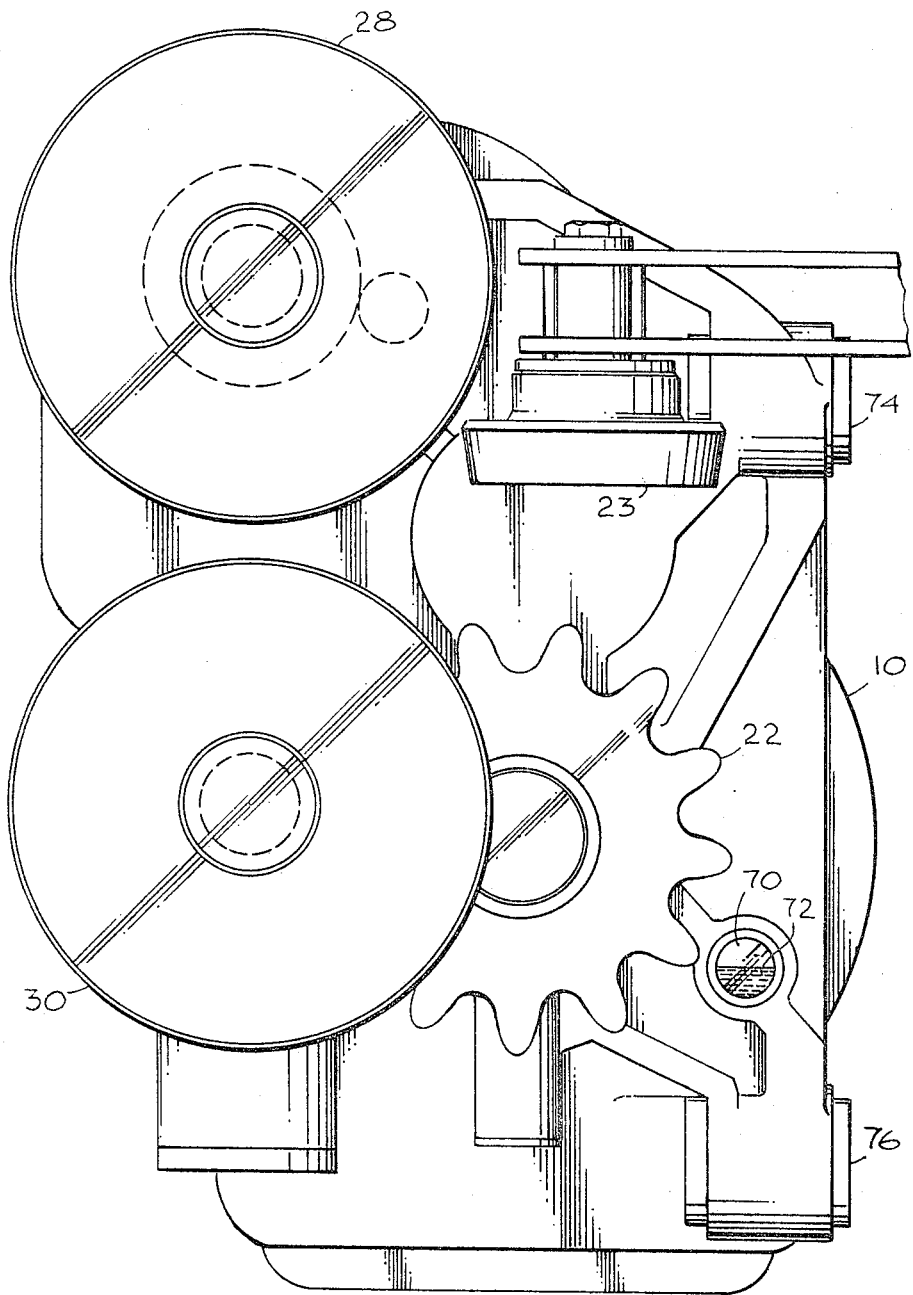
FIGURE 7 is a front view taken along the lines 7—7 of FIGURE 5, and shows the wheel placement.

FIGURE 7 is a view along the lines 7—7 of FIGURE 5, of the various wheels on the power system. The lower idler wheel 30 has pressure applied to it by an arrangement, the details of which are shown in FIGURE 6, to bias it against the track. Thereby positive traction of the apparatus going up or down an incline is further assured while permitting the wheels of the module to separate. Such separation is necessary in the event that there is a foreign object on the rail which may be pinched between the wheel 30 and either the idler wheel 28 or the high speed wheel 26.

In order to permit an observation of the level of the oil 72 within the gear mechanism housing, a transparent plate 70 is placed in the gear housing wall. The gear transmission housing is attached to the car or vehicle which is driven by it by means of four shock mounts, only two, respectively 74, 76, of which are shown in FIGURE 5. These prevent vibration from adversely affecting the driving mechanism.

Figure 8:
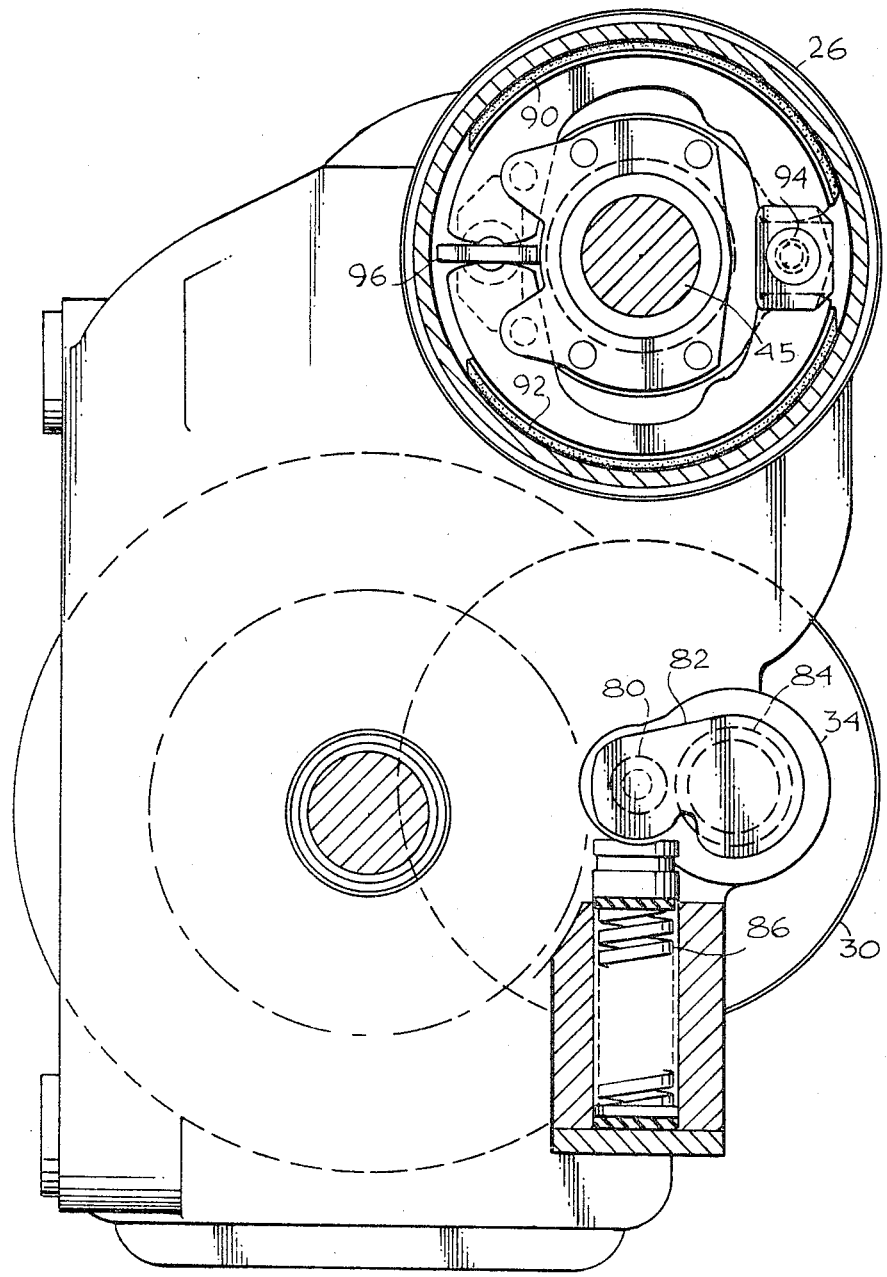
FIGURE 8 is a cross-sectional view taken along the lines 8—8 of FIGURE 5, and shows the brake contra wheel and contra wheel biasing mechanism.

FIGURE 8 is a cross-sectional view along the lines 8—8 of FIGURE 5 showing both the arrangement for mechanically braking the module as well as the manner in which the lower idler wheel 30 is supported. The lower idler wheel 30 is rotatably supported by a crank shaft 80, which in turn is supported at the end of a crank lever arrangement 82. The crank lever 82 is pivotably attached to a pivot 84. The pivot 84 is fixedly supported by an extension of the housing 34 for the gear box. A compression spring 86 has one end anchored in the gear box housing 36 and the other end pushes up on the lever 82 in order to urge the wheel 30 into pressing contact with the track. The arrangement described is such that the wheel 30, together with either the drive wheel or idler wheel, will pinch the track and insure a positive engagement therewith, except for locations where it is necessary that one of the wheels 30 give way in order to enable the unit being propelled to adjust itself to changes in track thicknesses, or to objects on the track requiring such an adjustment.

The brake arrangement uses a flange extension of the periphery of the high speed low torque wheel 26 against the inner surface of which the brake shoes 90, 92 are expanded when braking is required. The rim extension 27 of the wheel 26 may better be seen in FIGURE 5. These mechanical brakes for this apparatus are usually held inoperative and are only applied in the event of a power failure, since braking is normally effected by the motors being driven by the wheels through the gear box and thereby generating electrical power which is pumped back into the system. The arcuate brake shoes 90, 92 are pivotably anchored at one side of an anchor member 94. When it is desired to apply the brake a cam member 96 pivots, whereby the brake shoes 90, 92 are expanded against the inner aspect of the flange 27.

It was previously indicated that when, because of the steepness of the grade, a shift is desired from the high speed low torque drive to the low speed high torque drive, the shape of the track is altered so that the high speed drive wheel 26 no longer contacts the track but the gear wheel 22 engages a rack track. The problem that arises is that the module is traveling at a linear rate of approximately thirty miles an hour as a result of the drive due to the high speed wheels while the gear wheels are turning at a speed of four miles an hour. The first problem that arises is to reduce the speed of the train to four miles an hour. This is easily done and one suitable way is by terminating the power applied to the module so that its speed is reduced rapidly due to the regenerative dynamic braking action which takes place. Since the power supplied to the module is through any conventional rolling contact on a power rail (not shown), it is a simple matter to discontinue the power portion of the rail but to leave a second insulated rail portion which is properly connected to present a circuit so that regenerating dynamic braking may occur. These techniques are well known to those skilled in this art. It should be noted, however, that by reducing the linear speed of the module in this manner, the rotational speed of the gear wheels are also reduced since the transmission speed and thus the gear wheel speed is reduced about seven and one-half times. At this time however, the upper track surface 31U under the upper idler wheel is raised to engage the upper idler wheel and the portion of the upper track surface 31U underneath the high speed wheel is lowered to disengage the high speed wheel. Now, with both high speed wheel and gear wheel disengaged from any track surface and the module coasting at a linear speed of four miles an hour, power is applied again to the drive motors to bring the gear wheel speed up to four miles an hour.

The equalization in linear speed of the module to the same rotational speed at which the gear wheel is driven is still insufficient to permit the gear wheels to engage the rack gear without damage, the teeth of the gear wheels are properly phased with the teeth in the rack, in view of the fact that the gear wheels are permanently connected to and cannot be declutched from the transmission and its rotating mass attached to the module. An impact can occur which can jam or break the gear and rack. Prior art devices solve this problem by providing for a clutch whereby the gear wheel is decoupled from the vehicle and spins free. Therefore, when the vehicle carries the gear wheel into contact with the rack gear, since the sole mass is that of the gear wheel and possibly a portion of the shaft, it is very easily forced into phase by the rack gear whereupon the clutch again couples the gear wheel to the transmission.

The present arrangement, in order to minimize the complexity of the equipment carried, the number of controls required, and to reduce the cost of both the equipment and its maintenance solves the problem of the phasing of the gear wheels with the rack track in a novel, simple, and unique manner. It is done by means of linear synchronizing rack tracks hereafter called "linear synchrotracks."

FIGURE 9 is a side view in perspective of a linear synchrotrack and FIGURE 10 is a bottom view of the synchrotrack. In order to simplify the drawing, the remaining portion of the track over the synchrotrack over which the upper idler wheel rolls is omitted. The linear synchrotrack 100 actually comprises a single split track or two rack tracks respectively 102, 104 which are supported adjacent one another at one end 106 at which they join a solid rack portion 108 of the track 31. The width of the two synchrotracks including the spacing is substantially equal to the width of the solid rack track 108. They are supported at their one end 106 by being welded to the remainder of the track 31.

The first tooth 110 of the synchrotrack is smaller than the next few teeth 112 that follow, thereafter the remaining teeth 114 on the linear synchrotrack grow in size until they attain the size of the solid rack 108. The teeth 110, 112 and 114 are all rounded at the top. As may be seen in FIGURE 10, the teeth of the synchrotrack 102 are alternated in spacing with the teeth of the synchrotrack 104, so that their total frequency is that of the rack track.

When the module approaches the synchrotrack, after the gear wheels have been speeded up, as stated previously, so that the linear speed of the module and the rotational gear wheel speed are equal, the power to the transmission is cut off again. Power is not reapplied until the gear wheel 22 engages the solid rack gear. The load is carried only by the idler wheels. When the gear wheel engages the synchrotrack 100, if the alternate teeth of the track are completely out of mesh with the spaces between the teeth on the gear wheel, the synchrotrack is free to rise and thus enable its teeth to slip over the sides of the gear wheel teeth. However, in doing this, they exert pressure on the gear wheel to gradually bring it into proper phase for engaging the solid rack track. The pressure for causing this phasing is the lowest at the end of the synchrotrack which is free to move upward, as it should be when the synchronization action first commences. This force, however, gradually becomes greater as the gear wheel rotates farther and farther down the synchrotrack in view of the fact that it is approaching closer and closer to the end at which the synchrotrack cannot move as much as it can at the free end. Accordingly, it should be appreciated that the inclined plane action between the teeth of the gear and the teeth of the synchrotrack together with the retractability of the synchrotrack causes the proper phasing of the gear wheel teeth. The purpose of the alternate spacing of the teeth on the two portions of the synchrotrack, as may be seen from FIGURE 10, is to rapidly provide for synchronization and to reduce the vertical vibration which would occur should the linear synchrotrack be made of a single piece with teeth at the frequency of the rack track. Each of the synchrotracks has half the vibration it has as a single track. As a matter of fact, if more than two synchrotracks are used, the teeth spacing may be increased on each track and the vertical vibration is reduced accordingly.

To provide an appreciation of the forces which are controlled by means of the synchrotrack and the short distance in which its control is effectuated, by way of illustration and not by way of limitation, in an embodiment of the invention which was built, the torque measured at the periphery of the gear wheel when it was rotating at the speed of four miles an hour being driven by the transmission was 10,000 inch pounds. This was considerably reduced by cutting off the power applied to the transmission. The synchrotrack at the free end, acting as a cantilever beam, applied approximately 50 pounds of pressure on the teeth of the gear to bring it into phase. As the gear advances, the alternate portions of the synchrotrack alternatively move up and down increasing the pressure applied on the teeth of the gear wheel to bring it into phase so that by the time the center of the synchrotrack is reached, there is a pressure of approximately 300 pounds being applied. For a gear wheel having fifteen teeth with a 2½ degree pitch, the synchrotrack length was substantially 38 inches.

Figure 11:
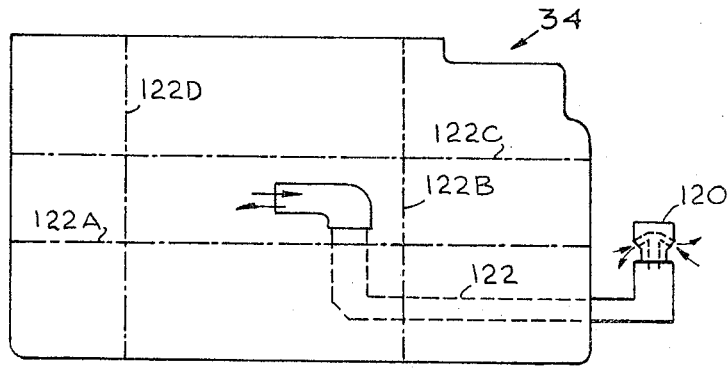
FIGURE 11 shows the transmission cover and the arrangement for preventing oil spillage.

In view of the fact that the module is intended to be rotatable so that it can be unloaded by being turned upside down, a problem arises in connection with the transmission. As is well known, the transmission is lubricated by being filled with oil up to a required level. It is also necessary to ventilate the interior of the transmission. The presence of a ventilator or breather opening enables oil to be spilled out of the transmission upon the rotation of the module. As may be seen in FIGURE 11, the problem was solved herein in a simple and yet unique manner. FIGURE 11 represents a gear case or housing 34. The manner in which the indicated problem is solved is by using a single opening within the gear housing for both filling with oil as well as for ventilation. From this opening 120 there extends within the gear housing, as represented by dotted lines, a tube 122 to substantially the central region of the gear housing. The oil lever assumed for any one of the four positions which the gear box assumes in being rotated is represented by the dash-dot lines respectively 122A, 122B, 122C, 122D. It may therefore be seen that by the simple expedient of having the filler tube extend to the central region of a gear container and filling the gear box with oil below the level of the tube, the problem of spillover for different orientations of the gear box is cured.

There has accordingly been described and shown hereinabove a drive system for a vehicle, such as the module described, wherein a single transmission without a clutch provides two different torque drives, either of which may be employed as required by virtue of a unique tracking system associated therewith. Other features of the system are the split or two separate motors having a completely enclosing common housing which while providing the effects of a differential gearing also provides such efficiency in cooling that for a given motor temperature more power output may be derived from the motor than can be obtained where two single motors are used. Further, there is a gain in the compactness of the system. Finally, the arrangement for lubricating the gear box is such that the vehicle can assume any orientation without spilling oil through the breather hole.

What is claimed is:

1. A vehicle propulsion system including a transmission having a first output shaft, a second output shaft, and gear means for rotatably driving said first output shaft with a high speed and low torque and said second output shaft with a low speed and high torque, motor means for driving said gear means, a drive wheel mounted on said first shaft for being rotatably driven thereby, a gear mounted on said second shaft for being rotatably driven thereby, track means between said drive wheel and gear, said track means including a drive surface for engaging said drive wheel only when it is desired to propel said vehicle by said drive wheel and a rack track surface opposed to said drive surface for engaging said gear only when it is desired to propel said vehicle by said gear, said drive surface being omitted when said rack track surface is present, said rack track surface being omitted when said drive surface is present, and means for synchronizing the rotation of said gear with said rack track for properly engaging said rack track with said gear.

2. A vehicle propulsion system as recited in claim 1 wherein said wheel has a rim extension and there is included brake shoe means for applying braking pressure to said rim extension.

3. A vehicle propulsion system as recited in claim 1 wherein said track means includes an upper and a lower surface, said upper surface being present only when said rack track surface is present, an upper idler wheel, means for rotatably supporting said upper idler wheel with its periphery engaging said upper track surface, a lower idler wheel, and means for supporting said lower idler wheel from said transmission including means for yieldably biasing said lower idler wheel with its periphery in rolling contact with the lower surface of said track.

4. A vehicle propulsion system as recited in claim 1 wherein said means for synchronizing the rotation of said gear with said rack track surface comprises synchronizing track means extending from said rack track surface for engaging said gear prior to its coming into contact with said rack track, said synchronizing track means including a first and second rack track placed side by side, the teeth of said first rack track being positioned alternately relative to the teeth of said second rack track, means attached to the end of said first and second rack track adjacent said rack track for preventing motion thereof while the other ends of said first and second rack track are movable.

5. A vehicle propulsion system as recited in claim 1 wherein said transmission means includes a housing enclosing said transmission means, an opening in said housing for introducing a lubricant thereinto and for enabling breathing, and a tube connected to said opening, said tube extending from said opening into the center region of said housing wherein no lubricant is present.

6. Apparatus as recited in claim 1 wherein said transmission means includes a third output shaft rotatably driven by said gear means, an air impeller mounted on said third output shaft to be rotatably driven thereby for impelling air, a housing covering said motor means, and means for directing the air driven by said impeller over the housing of said motor means.

7. Apparatus for propelling a vehicle, comprising a first and a second motor means each including a stator and a rotor, said rotors being aligned with one another, a common housing for said first and second motor means, a first and a second transmission means respectively disposed on either side of said first and second motor means for being driven therefrom, said first and second transmission means each having a first output shaft, a second output shaft, and gear means driven by said motor means for rotatably driving said first output shaft at a relatively high speed and low torque and said second output shaft at a relatively low speed and high torque, a first wheel mounted on said first output shaft for being rotatably driven thereby, a second wheel having substantially the same dimensions as said first wheel, bearing means for mounting said second wheel on said first output shaft for establishing said second wheel as an idler wheel, a gear wheel mounted on said second output shaft for being rotatably driven thereby, a third wheel, and means for rotatably supporting said third wheel from said transmission means, said means for rotatably supporting said third wheel including means for yieldably biasing said third wheel to oppose said first and second wheel.

8. Apparatus as recited in claim 7 wherein each said first and second transmission means includes a third output shaft rotatably driven by said gear means, an air impeller mounted on said third output shaft for impelling air in response to rotation thereby, and means for directing the air impelled by said air impeller over the common housing of said motors.

9. Apparatus as recited in claim 7 wherein there is included two track means, one for each of the sets of wheels carried by said first and second transmission means, each said track means includes a first surface having first and second adjacent portions, a second surface opposed to said first surface, and a rack track positioned adjacent said second surface, said rack track and said first portion of said first surface being omitted when said second adjacent portion of said first surface is present, means positioning said track means for enabling said gear wheels to engage said rack track, said first and second portions of said first surface to respectively engage said first and second wheels, and said second surface to engage said third wheel.

10. Apparatus as recited in claim 9 wherein each said track means includes a base portion angularly disposed relative to said first and second surfaces, a first pair of side wheels, means for supporting said first pair of side wheels on one side of said vehicle and in rolling contact with the base portion of one of said two track means, a second pair of side wheels, and means for supporting said second pair of side wheels on the side of said vehicle opposite to said one side and in rolling contact with the base portion of the other of said track means, whereby said vehicle is maintained laterally stable.

11. Apparatus as recited in claim 7 wherein each said first wheel has a rim extension on the periphery thereof, and there are included brake shoe means for applying breaking pressures to said rim means when required.

12. A propulsion system for a vehicle including a first shaft, a drive wheel mounted on said first shaft, a second shaft, a gear wheel mounted on said second shaft and vertically spaced from said drive wheel, transmission means coupled to said first and second shafts for rotatably driving said first shaft at a relatively low torque and high speed and for rotatably driving said second shaft at a relatively high torque and low speed, idler wheel means, means for supporting said idler wheel means from said transmission means adjacent to said drive wheel without applying any rotational drive to said idler wheel means, and track means between said drive wheel and gear wheel including a rack track for engaging the gear wheel when a low speed high torque propulsion is desired, a first surface for engaging the periphery of said drive wheel when said rack track is omitted and a high speed low torque propulsion is desired, and a second surface for engaging said idler wheel means when said drive wheel does not engage said first surface.

13. A propulsion system as recited in claim 12 wherein there is included another idler wheel, said track means includes a third surface disposed opposite said first and second surfaces, and means for yieldably and rollably supporting said other idler wheel from said transmission means and in rolling contact with said third surface.

14. Apparatus as recited in claim 12 wherein there is included synchronizing rack track means preceding said rack tracks for synchronizing the rotation of said gear wheel with the gear teeth of said rack track.

15. Apparatus as recited in claim 14 wherein said synchronizing rack track means includes a first and a second synchro track, means holding said first and second synchro track in side by side relation within one another extending from the beginning of said rack track, the width of said first and second synchro track when in side by side relation substantially equalling the width of said rack track, the teeth of said first and second synchro track being positioned in alternate relation with one another.

16. The improvement in a cooling system for an electrical motor comprising a motor having a stator and a rotor centrally mounted with said stator, motor housing wall means against which said stator abuts and which encloses said motor, outer housing wall means spaced from and enclosing said motor housing wall means to provide an air space between it and said motor housing wall means, an air blower, means for coupling said air blower to said motor to be driven from said motor, and shroud means for directing air from said blower into said air space to cool said motor.

References Cited

UNITED STATES PATENTS

| | | | |
|---|---|---|---|
| 349,624 | 9/1886 | Abt | 105—29 X |
| 443,768 | 12/1890 | Hunt | 105—29 |
| 511,911 | 1/1894 | Schatz | 105—29 X |
| 561,022 | 5/1896 | McConnell | 105—29 X |
| 569,097 | 10/1896 | Fryer | 105—29 |
| 721,877 | 3/1903 | Fedeler | 105—59 |
| 832,586 | 10/1906 | Bothwell | 105—29 |
| 842,951 | 2/1907 | Gibbs | 105—59 |

FOREIGN PATENTS

| | | |
|---|---|---|
| 707,176 | 6/1941 | Germany. |
| 23,739 | 12/1899 | Great Britain. |

ARTHUR L. LA POINT, *Primary Examiner.*

H. BELTRAN, *Assistant Examiner.*

U.S. Cl. X.R.

74—339, 422; 104—147; 105—30, 59, 153